United States Patent [10] Patent No.: US 6,320,915 B1
Stott et al. (45) Date of Patent: Nov. 20, 2001

(54) OFDM SYMBOL SYNCHRONIZATION

(76) Inventors: Jonathan Hghton Stott, 36 Charlotte Grove, Smallfield, Horley, Surrey RH6 9AR; Adrian Paul Robinson, 25 Munden Street, London W14 0RH; Christopher Keith Perry Clark, 3 Stumblets, Poundhill, Crawley, RH10 7TR, all of (GB)

( * ) Notice: Subject to any disclaimer, the term of this patent is extended or adjusted under 35 U.S.C. 154(b) by 0 days.

(21) Appl. No.: 09/071,020

(22) Filed: May 1, 1998

(30) Foreign Application Priority Data

May 2, 1997 (GB) .................................................. 9709063

(51) Int. Cl.[7] ................................................. H03L 27/06
(52) U.S. Cl. ........................................... 375/340; 375/316
(58) Field of Search .................................... 375/340, 316, 375/354, 355, 362, 259, 224, 343; 370/503

(56) References Cited

U.S. PATENT DOCUMENTS

| 5,450,456 | 9/1995 | Mueller | 375/224 |
| 5,559,833 | 9/1996 | Hayet | 375/259 |
| 5,610,908 | * 3/1997 | Shelswell et al. | 370/210 |
| 6,031,827 | * 2/2000 | Rikkinen et al. | 370/330 |

FOREIGN PATENT DOCUMENTS

| 0 653 858 A2 | 11/1994 | (EP) . |
| 0 656 706 A2 | 6/1995 | (EP) . |
| 0 772 332 AS | 5/1997 | (EP) . |
| 0 876 031 A2 | 11/1998 | (EP) . |
| 2 296 165 A | 6/1996 | (GB) . |
| 2307155 A | 5/1997 | (GB) . |
| WO 95/03656 | 2/1995 | (WO) . |
| WO 95/05042 | 2/1995 | (WO) . |
| WO 98/39886 | 9/1998 | (WO) . |

* cited by examiner

*Primary Examiner*—Chi Pham
*Assistant Examiner*—Khai Tran

(57) ABSTRACT

Improved synchronization of OFDM signals is achieved. A controlled oscillator (8) provides clock pulses to derive complex samples of an input signal which are applied both to a fast Fourier transform (5) for data recovery and to a synchronization unit (9). The synchronization unit generates the complex product XY* of the input and the delayed input, which is applied to a high-pass filter (30) to suppress frequencies below the symbol frequency. The filter output is applied through a symbol comb filter (40) to an adaptive slicer (50) which determines the larger magnitude of the real and imaginary components of the signal. A pulse processor (60) generates a single pulse at the leading edge of the symbol pulse which is applied to a symbol counter (70). The symbol counter includes two count stages arranged to lock in quickly and yet be variable to accomodate different guard intervals in the OFDM signal.

14 Claims, 6 Drawing Sheets

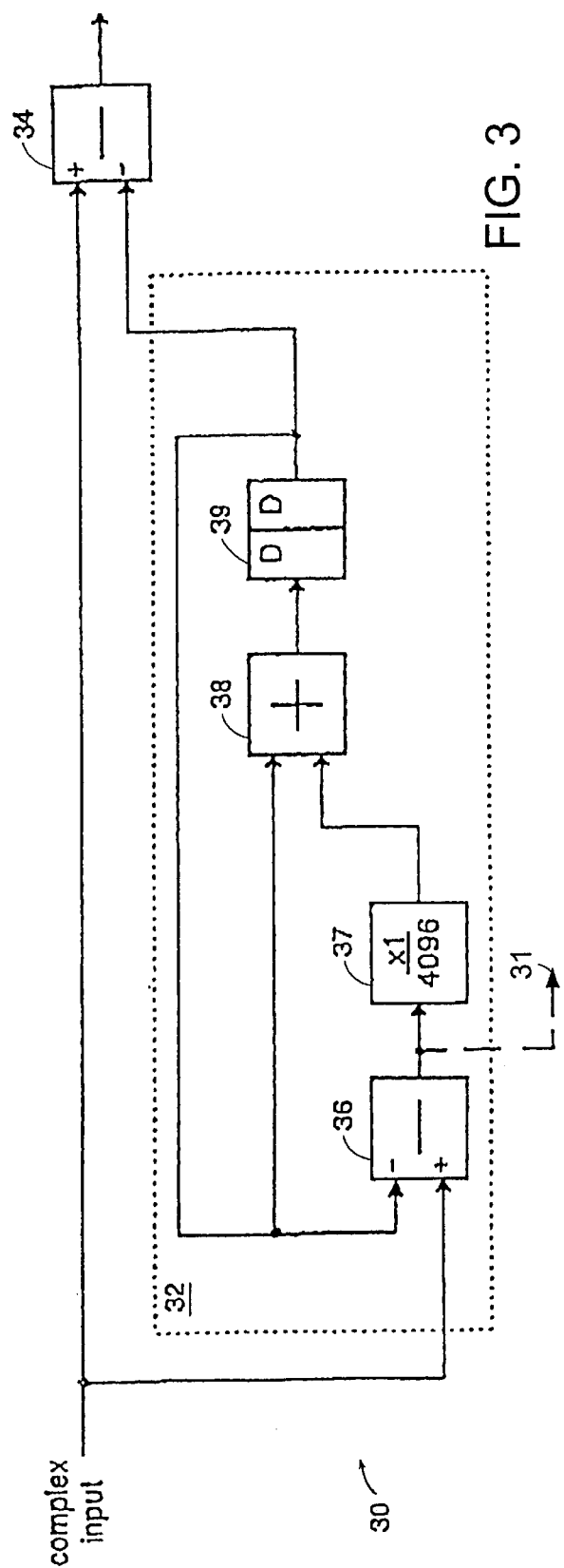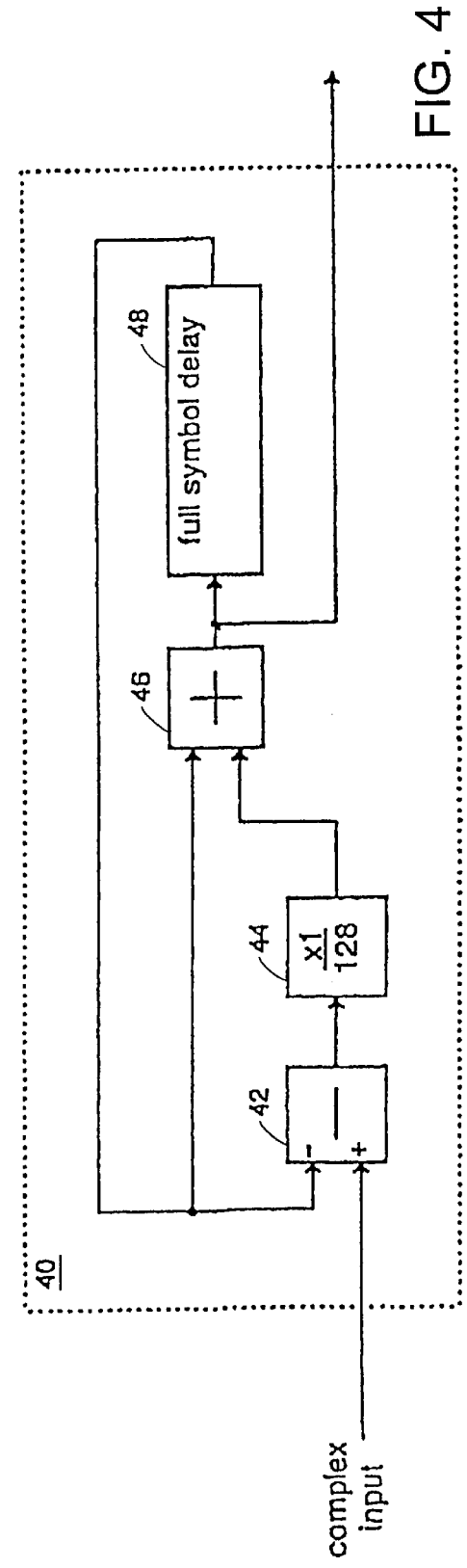

OFDM SYMBOL SYNCHRONIZATION

BACKGROUND OF THE INVENTION

This invention relates to the synchronization of Orthogonal Frequency Division Multiplex (OFDM) signals, such as may be used for broadcasting digital television signals in the uhf (ultra high frequency) bands, or for digital audio broadcasting (DAB).

The form of OFDM signal proposed for this purpose consists of data signals and reference information modulated as QPSK (quadrature phase shift keying) or QAM (quadrature amplitude modulation) on to several thousand individual carriers, evenly spaced in frequency and occupying a total bandwidth of several Megahertz in the uhf spectrum. The data signal on each carrier has a relatively long symbol period and this, in part, gives the signal its good performance in conditions of multipath propagation. The multipath performance is further enhanced by the inclusion of a guard interval in which a portion of the modulated signal waveform taken from the end of each symbol is also included at the beginning of the same symbol period. Different fractions of the basic symbol period, such as $\frac{1}{32}$, $\frac{1}{16}$, $\frac{1}{8}$, or $\frac{1}{4}$, can be used in this way to provide immunity to multipath distortion of increasingly long delays.

More specifically, each symbol is extended by a period $T_G$ (the guard interval) which precedes the "useful" or "active" symbol period $T_S$, so that the whole symbol now lasts $T_T$ in total. $T_S$ is the reciprocal of the carrier spacing $f_S$, and is the duration of the time domain signal produced or analysed by the FFT (fast Fourier transform) in the transmitter and receiver respectively.

Each carrier is continuous over the boundary between the guard interval and the active part of the same symbol, keeping the same amplitude and phase. If the signal at complex baseband is considered, with all the carrier frequencies not only spaced $f_S$, but also equal to multiples of $f_S$, then the signal in the guard interval is effectively a copy of the segment of the signal occupying the last $T_G$'s worth of the active part, as shown in FIG. 8 of the accompanying drawings. It follows that the signal has the same value at any two instants which are separated by $T_S$ but lie within the same symbol.

Specific proposals for synchronization of OFDM receiving apparatus have been published for example in European Patent Applications EP-A-0 653 858 and 0 608 024, and International Patent Applications WO95/07581, WO95/05042 and WO95/03656.

The principal requirement for synchronization in a receiver is to obtain from the signal waveform a reliable time synchronization pulse related to the start of the symbol period. Such a pulse could then be used to start, at the correct position in the waveform, the process of Fourier transformation which accomplishes a major portion of the demodulation process. A second requirement for synchronization is to lock the digital sampling clock in the receiver to an appropriately chosen harmonic of the symbol period. However, the modulated OFDM waveform produced by adding together all the modulated carriers is essentially noise-like in nature and contains no obvious features such as regular pulses which could be used to synchronize the circuitry of a receiver.

Because of this, we have previously proposed techniques for synchronization which are based on correlation of the signal with a version of itself delayed by the basic symbol period. The similarity between the portion included to form the guard interval and the final part of the basic symbol is then shown as a region of net correlation, while the ramainder of the symbol period shows no correlation. Even so, the correlated waveform still reflects the noise-like nature of the signal waveform and can be impaired by signal distortions, so it is necessary to process the signal further to obtain reliable synchronization.

Our European patent application No. 96307964.5, publication No. 0 772 332 (publication date May 7, 1997), describes the use of a correlator with a filter which exploits the periodicity of the waveform to form a complex symbol pulse and then uses the argument of the pulse to obtain frequency control for a local oscillator. In addition, the modulus of the pulse signal is used to derive a pulse related to the start of the symbol period and to derive a signal to control the clock frequency in the demodulator. A complex integrate-and-dump technique is included in the clock loop to suppress interference.

SUMMARY OF THE INVENTION

The present invention in its various aspects is defined in the independent claims below, to which reference should now be made. Advantageous features of the invention will be described in more detail by way of example with reference to the drawings.

A preferred embodiment of the invention is described in more detail below. The preferred embodiment also uses correlation and a filter which exploits the periodicity of the waveform to form a symbol pulse, but includes three additional improvements:

1. A high-pass filter is included in order to counteract the effects of interference. This is achieved by suppressing frequencies substantially below the symbol frequency, prior to the determination of the position of the start of the symbol (by adaptive slicing as described below, or otherwise).

2. An adaptive slicing technique based on the modulus and the argument of the symbol pulse waveform is employed in order to extract timing information from the pulse. Thus, the magnitude alone is not used, as this would give inferior results. As a further development of this, we have recognised that an approximation to the correct phase can be used initially, as once the system has locked correctly to the incoming signal, the desired phase will become aligned with the real axis, and this can thereafter be assumed to be the correct phase or argument.

3. A symbol period counter is used to provide stable and correctly timed pulses to start the process of Fourier transformation and to provide a control signal to lock the sampling clock in the demodulator. The symbol period counter is of particularly ingenious construction which does not require the counter to rephase itself through a full symbol period. Instead we have appreciated that the counter can be split into two parts, in such a way as to lock in much more quickly.

The three improvements can with advantage be used together, but in the alternative can be employed independently of each other. The first and second features are used with the complex conjugate (XY*) method described in our above-mentioned European patent application No. 96307964.5, but the third feature noted above does not require use of the complex conjugate method and can be used with other methods of deriving the complex signal.

BRIEF DESCRIPTION OF THE DRAWINGS

The invention will now be described in more detail, be way of example, with reference to the accompanying drawings, in which:

FIG. 3 is a block circuit diagram of the high-pass filter circuit of the synchronization circuit in the receiver of FIG. 1;

FIG. 4 is a block circuit diagram of the symbol comb filter circuit of the synchronization circuit in the receiver of FIG. 1;

DETAILED DESCRIPTION OF THE PREFERRED EMBODIMENT

The system will be described using parameter values from a particular system of digital OFDM signal transmission by way of example. More details of this system are contained in ETSI draft document prETS 300 744, November 1996, now document ETS 300 744 dated March 1997.

Figure 1:
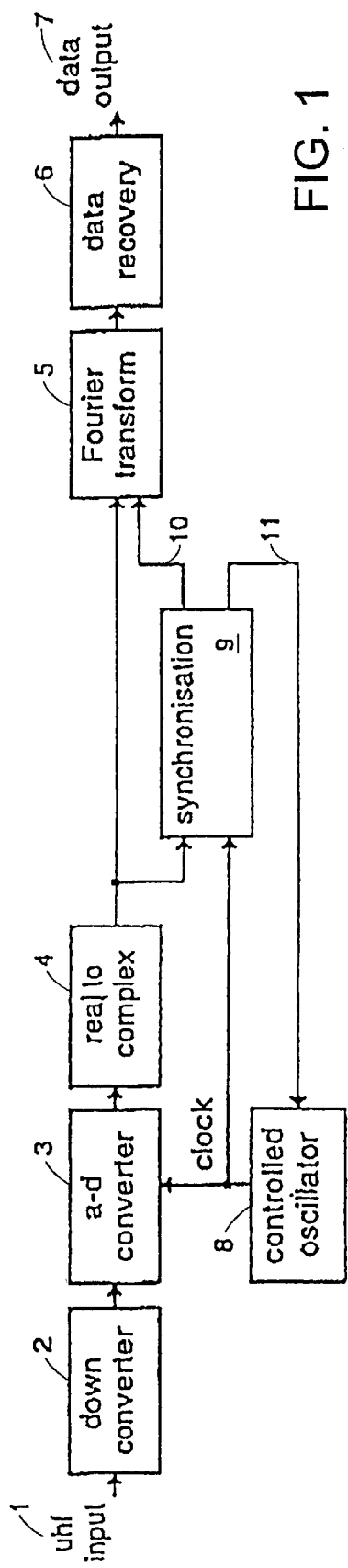
FIG. 1 is a block circuit diagram of the relevant part of an OFDM receiver embodying the invention.

The relevant parts of an OFDM receiver embodying the invention are shown in block diagram form in FIG. 1. The receiver has a uhf input 1 which applies a received signal to a down-converter 2. The output of the down-converter is applied to an a–d (analog-to-digital) converter 3 which receives a clock input from a voltage-controlled crystal oscillator 8 and supplies an output to a real-to-complex converter 4. The output of the real-to-complex converter 4 is applied first to a Fourier transform circuit, such as a well-known FFT (fast Fourier transform), and also to a synchronization unit 9. The output of the Fourier transform circuit is applied to data recovery circuitry 6, based on that in a known OFDM receiver, to provide a data output at 7. The synchronization unit 9 has two outputs, namely an output 10 which is coupled to the Fourier transform circuit 5, and an output 11 which is applied to the controlled oscillator 8. Finally, the synchronization unit 9 receives the clock signal from the controlled oscillator 8.

The operation of the circuit of FIG. 1 is as follows. A received uhf OFDM input signal at the input 1 is down-converted by frequency shifting in the down-converter 2 to occupy a bandwidth of nominally 8 MHz in the region 0–9 MHz. It is then sampled by the a–d converter 3, operating with a sampling frequency of 18·285714 MHz from the voltage-controlled crystal oscillator 8. The real samples from the a–d converter are converted by the real-to-complex converter 4 into the form of complex samples at 9·142857 MHz required for Fourier transformation in the Fourier transform circuit 5. As each complex sample consists of real (R) and imaginary (I) components, it is convenient to multiplex the two together in a sequence $R_1I_1R_2I_2$ . . . thus retaining the 18·285714 MHz rate of the data stream. Accordingly, the synchronization unit 9 accepts the OFDM signal waveform as a series of complex samples which are then processed to produce a series of regular symbol pulses at output 10 to start the transform at the appropriate time in the symbol. Additionally, the synchronization unit can provide a signal at output 11 to lock the controlled oscillator 8. This is achieved by comparing the timing of regular symbol pulses which are produced by dividing the sampling clock by an appropriate ratio, with the timing of the symbol pulses extracted from the incoming signal waveform.

Figure 2:
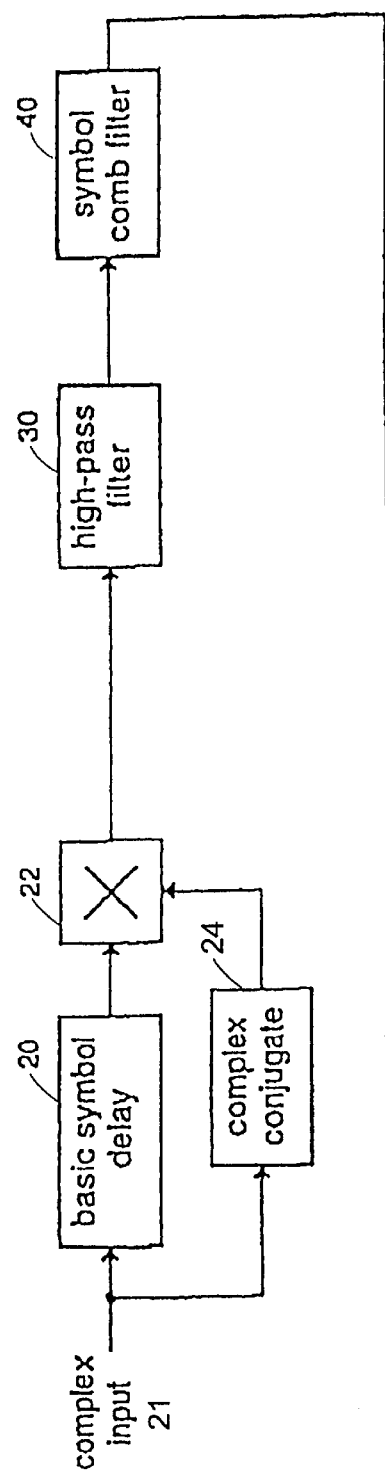
FIG. 2 is a block circuit diagram of the synchronization unit of the receiver of FIG. 1.

The main elements of the synchronization unit 9 are shown in FIG. 2. Referring to FIG. 2, the complex input from the real-to-complex circuit 4 is applied to an input terminal 21 and thence to a delay 20 with a duration equal to the basic symbol period $T_S$ and to a conjugating circuit 24. The conjugating circuit 24 forms the complex conjugate of each sample by inverting the imaginary part. The outputs of the delay 20 and conjugating circuit 24 are both applied to a full four-component complex multiplier 22. Thus, the multiplier provides an output XY*, where Y is the input signal, X is the signal Y after the delay 20, and the asterisk (*) indicates the complex conjugate. The delay 20, conjugating circuit 24 and multiplier 22 operate as a correlator, as described in our above-mentioned European patent application No. 96307964.5. The output of the multiplier 22 is applied to a high-pass filter circuit 30, the output of which is applied to a symbol-period comb filter 40. The output of the filter is then applied to an adaptive slicing circuit 50 the output of which in turn is applied to a pulse processing circuit 60. The output of the pulse processing circuit 60 is then applied to a symbol counter 70.

The operation of the synchronization circuit shown in FIG. 2 is as follows. The noise-like OFDM signal in complex form is applied to the delay 20 with a duration equal to the basic symbol period, and to the conjugating circuit 24 which forms the complex conjugate of each sample by inverting the imaginary part. The correlation between the two signals is produced by the complex multiplier 22 and appears as a noisy pulse waveform at symbol rate.

It should be recognised that the conjugation process 24 can alternatively be placed in the delayed signal, that is in series with the delay 20, with equal effectiveness. That is, the signal YX* is generated rather than XY*.

The high-pass filter circuit 30 is included to remove complex-valued offsets introduced by interference. This is followed by the symbol-period comb filter 40, which exploits the periodic nature of the waveform to suppress noise and other impairments so as to produce a rectangular pulse, the duration of which is related to the guard interval. It should be noted that the comb filter 40 could be placed before the high-pass filter 30 with similar effectiveness. The adaptive slicing circuit 50 is used to prepare the complex waveforn for slicing at the most advantageous point, taking account of the effects of local oscillator frequency errors, amplitude variations, and distortions arising from multipath propagation. This circuit 50 is followed by the pulse processing circuit 60, which generates a single pulse at the leading edge of the symbol pulse, and prevents the generation of spurious pulses which might arise from multiple crossings of the slicing level in a noisy signal.

The timing of the pulses produced by the pulse processing circuit 60 is compared with the timing of pulses produced by dividing the sampling clock frequency down to symbol rate in the symbol counter 70. The comparison produces a signal at output 11, which is used to control the clock oscillator 8. Regular appropriately-timed symbol rate pulses at output 10 are derived from the symbol counter 70 and are used to start the Fourier transform processing on each symbol. The pulses from the pulse processing circuit 60 are also used for initial resetting of the symbol counter 70 during lock-up; but after the initial period, adjustment of the position of the pulses at output 10 is obtained only by controlling the sampling clock frequency. This ensures that the number of clock periods between symbol pulses remains constant, which is necessary for simplifying the operation of subsequent processing in the data recovery circuitry 6 in FIG. 1.

The operation of the individual circuits 30, 40, 50, 60 and 70 of FIG. 2 will now be described in more detail.

Because an OFDM signal is made up of a large number of carriers, if in-band sinusoidal interference is present, then only a few carriers will be affected and the resulting errors will be within the capacity of the error correcting codes of the system. However, such signals can cause premature synchronization failure by introducing a complex offset signal into the output of the correlator multiplier 22 in FIG. 2, so that the slicer 50 fails to detect the symbol pulses.

We have appreciated that the offset introduced by interference can be substantially removed by incorporating a high-pass filter which cuts out frequencies substantially below the symbol frequency. This filter is located before rather than after the adaptive slicing or other means for determining the phase or argument of the complex signal. FIG. 3 shows the details of the high-pass filter arrangement 30 used, consisting of a recursive low-pass filter 32 connected to the output of the multiplier 22 (FIG. 2) and which extracts the average level of the signal, and a subtractor 34 also connected to the output of the multiplier 22, and which subtracts the filter output from the input signal and thus has its non-inverting input connected to the output of the multiplier 22 and its inverting input connected to the output of the filter 32.

The recursive low-pass filter 32 comprises a subtractor 36 the non-inverting input of which is connected to receive the complex input from the multiplier 22 and the output of which is connected to a divider or binary shift circuit 37, which divides by 4096 by shifting the binary values by 12 places. The output of the circuit 37 is applied to an adder 38, the output of which is applied to a register or delay device 39 providing two clock periods of delay. The output of the delay device 39 constitutes the output of the filter 32 and is applied to the inverting input of the subtractor 34, and is also applied both to the other input of the adder 38 and to the inverting input of the subtractor 36.

The arrangement of the subtractor 36, the binary shift circuit 37, the adder 38, and the delay device 39 constitutes a recursive loop which causes 1/4096th of the input to be added to 4095/4096ths of the previously accumulated total, thereby producing a long-term average of the input signal. The value of the shift factor 37 is chosen, on the one hand, so that the change of average value during the symbol period is small and, on the other hand, so that the acquisition time is not significantly lengthened. Since the signal is in the form of time-multiplexed real and imaginary samples, the low-pass filter includes two clock periods of delay 39 so that the real and imaginary signals are processed at separate time instants.

An alternative method of producing an average as the output of the low-pass filter described is to accumulate the input signal for a period, store the accumulated total, and divide by the number of samples. Such an arrangement is less preferred because there is the possibility of introducing abrupt changes as new accumulated values are applied to the subtractor.

Whereas FIG. 3 shows the high-pass filter arranged as a low-pass filter and a subtractor, it should be noted that the output can alternatively be taken more simply from subtractor 36, since subtractors 34 and 36 share common inputs. This is indicated in dashed lines at 31. Thus the filter does not have to operate by subtraction of the low-frequency components from the signal in order to provide a high-pass function; other filter designs may be used. Equally the filter does not have to be a recursive filter. The cut-off characterstic of the filter need not be particularly steep; there should not however be significant attenuation at the symbol frequency.

Because of the noise-like nature of the correlated signal, it is desirable to filter the signal so as to reduce the noise before slicing to detect the symbol pulse. However, conventional low-pass filtering would distort the pulse, degrading the sharpness of the edges. This is undesirable, because the position of the start of the pulse is of particular interest for synchronization. It is therefore greatly preferred to follow the high-pass filter with a comb filter arrangement 40 which combines signal values at corresponding positions from one symbol to another. This suppresses the noise components, but retains the underlying shape of the pulse. Moreover it is necessary to filter the signal in this way to suppress product terms arising from the multiplication of interference with the signal in the correlation multiplier 22, which are not suppressed by the high-pass filter 30.

The arrangement used for the symbol comb filter 40 in the preferred embodiment of the invention is shown in FIG. 4. The filter 40 comprises a subtractor 42 the non-inverting input of which is the input to the filter 40 and is connected to receive the output of the high-pass filter 30. The output of the subtractor 42 is applied to a divider or binary shift circuit 44 which shifts the binary signal by seven places to effect division by 128. The output of the shift circuit 44 is then applied to an adder 46, the output of which constitutes the output of the filter 40. The output of the adder 46 is also applied to a delay device 48 providing a delay of a full symbol period, the output of which is fed back both to the other input of the adder 46 and to the inverting input of the subtractor 42. It will be noted that, as in our above-mentioned European patent application No. 96307964.5, the filter is based on filter elements, here a single filter element arranged recursively, having a delay equal to the total symbol period $T_T$.

The subtractor 42, the shift element 44, and the adder 46 cause 1/128th of the input to be added to 127/128ths of the previously stored value for that position in the symbol. The value of shift is chosen as a compromise which gives adequate noise-suppression, but does not significantly lengthen the acquisition time of the circuit. The delay 48 has capacity for the full symbol period, that is, the basic symbol period $T_S$ and the guard interval $T_G$, with real and imaginary values for each complex sample position. The output is taken from adder 46 to reduce the delay through the circuit.

While the symbol comb filter 40 suppresses noise components to produce a recognisable pulse, several other factors should be taken into account to allow the signal to be sliced in the adaptive slicer 50 at the optimum position. First of these is that, during lock-up at least, there may be a local oscillator frequency error in the down-converter 2 in FIG. 1. Such an error causes the complex pulse to be rotated from its nominal position on the real axis to another position in the Argand diagram, so that the argument of the pulse can take any value. In addition, the modulus of the pulse can vary; for example, when the automatic gain control measurement of the down-converter is influenced by high-level interference so that the level of the wanted OFDM signal is reduced. Finally, the shape of the pulse can vary due to multipath propagation. For example, an echo equal in amplitude to the wanted signal, when allowance is made for the effect of automatic gain control, would place a step halfway up the rising edge of the received pulse waveform.

Taking the magnitude or modulus of the signal would overcome the effect of a local oscillator error, but has other disadvantages. This is because the effect of the high-pass filter 30 causes the pulse waveform value to be non-zero during the basic symbol period of the waveform, particularly if a long guard interval is used. Thus, when the modulus is taken, this degrades the height of the pulse, resulting in potentially reduced ruggedness and premature failure. The theoretical optimum approach would be to measure the argument of the pulse and to slice the signal in that plane, thus preserving the full height of the pulse and rejecting contributions of noise and distortion from the orthogonal plane. In practice, however, this has a number of significant complexities which make its implementation difficult, but there is a simplification of the approach which achieves similar effectiveness. This is shown in FIG. 5.

Figure 5:
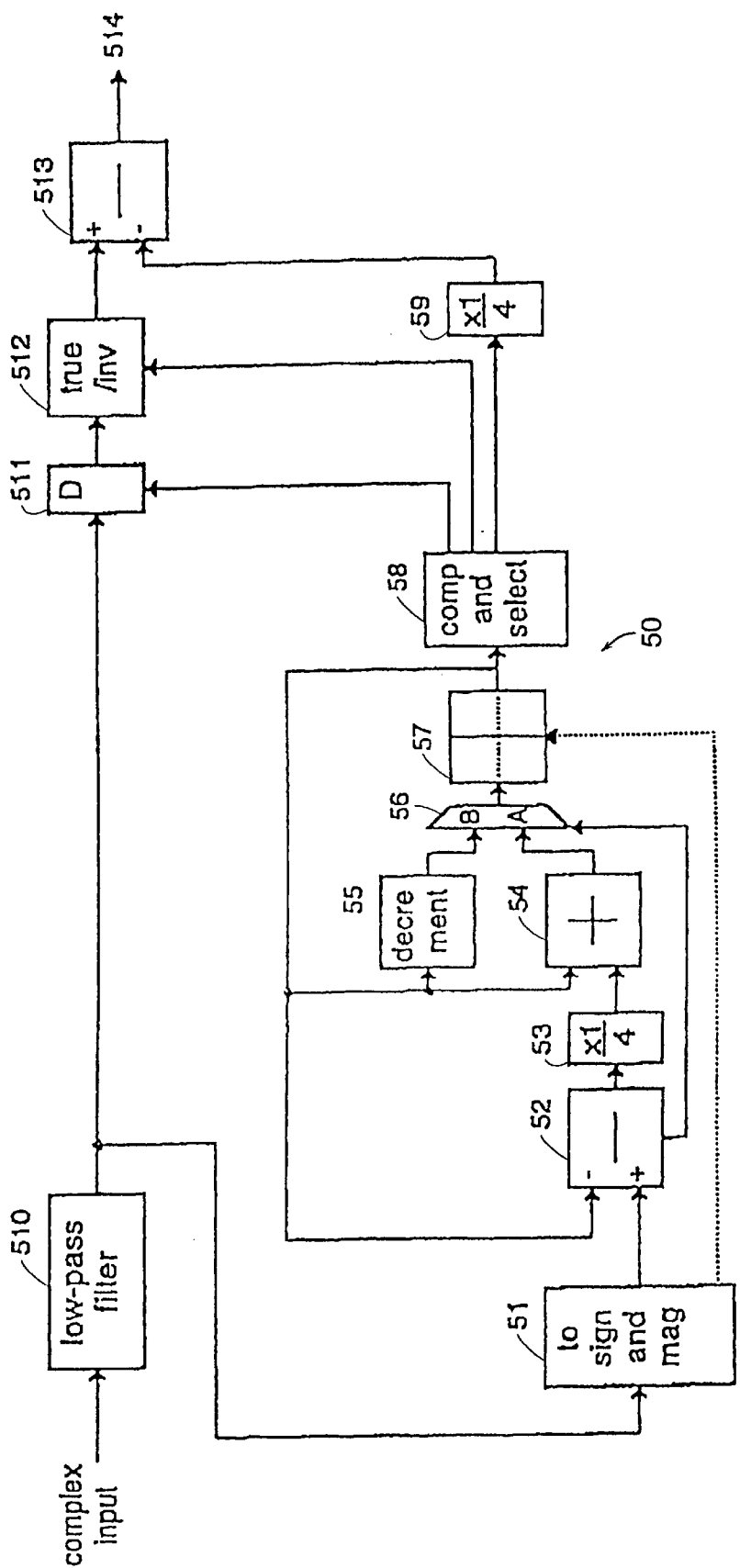
FIG. 5 is a block circuit diagram of the adaptive slicing circuit of the synchronization circuit in the receiver of FIG. 1.

The basis of the method shown in FIG. 5 is the recognition that, if the plane of the argument of the symbol pulse is close to either the real axis or the imaginary axis, then that signal component represents a good approximation to the signal in the plane of the pulse. The method then consists of determining which axis is closer to the required plane and selecting the corresponding signal component. Initially this constitutes only an approximation to the correct value, but it is good enough to start the lock-in process. Furthermore, it is recognised that, after the initial lock-up period, the plane of the symbol pulse will lie along the real axis, so that the simplified method then becomes equivalent in performance to the optimum approach.

In more detail, the method is as follows. After a small degree of low-pass filtering of the signal from the symbol comb filter 40 in a filter 510 to smooth off peaks in the top of the pulse waveform, the components of the complex signal time-multiplexed real and imaginary samples are converted to sign-and-magnitude representation in a circuit 51. The magnitudes of the real and imaginary values are then individually compared by a subtractor 52 with real and imaginary values previously stored in a pair of registers 57 acting as a store.

The sign bit resulting from the subtraction in subtractor 52 is used to control a selector 56 having two inputs A and B respectively. The control is such that, if the input is less than the stored value from registers 57, input B is selected, while if the input is greater than or equal to the stored value, input A is selected. Input B selects the stored value through a decrementing circuit 55, which is connected to the output of the registers 57. The decrementing circuit 55 occasionally subtracts 1 from the stored magnitude so that, if input B remains selected, the stored values are gradually reduced. The input A of the selector receives the output of the subtractor 52 after division by four in a shift circuit 53 and addition in an adder 54 to the output of the registers 57. If input A is selected, adder 54 adds one-quarter of the amount by which the input exceeds the stored value produced by subtractor 52 and shifter 53 to the stored value, thus rapidly acquiring a value near to the peak value without completely following individual noise spikes. In each case, the sign associated with the individual real and imaginary samples is also selected by selector 56 and stored in registers 57.

Thus, registers 57 contains values that are representative of the peak real and imaginary values of the symbol pulse. These values are compared in a comparator and selection circuit 58, which determines whether the real or the imaginary component has the greater peak magnitude, and controls the enabling of a register 511 which is connected to the output of the filter 510 so as to select either all the real samples from the input or all the imaginary samples, as appropriate. Also, circuit 58 selects the sign of the stored value with the greater magnitude and uses this to control the inversion of the input signal samples in a true/invert unit 512. The output of unit 512 thus always provides the larger of the real and imaginary signal components, with a positive-going excursion for the symbol pulse.

A further output of circuit 58 provides the larger of the two stored magnitudes, which is multiplied by a factor of one-quarter by a shifter 59, to be subtracted from the pulse waveform produced by unit 512 in a subtractor 513. A factor of one-quarter is used, rather than one-half, so that if the pulse is distorted by the presence of a large echo so as to have a step in the rising edge, the slicing process still reliably detects the earliest part of the edge. The slicing process then consists simply of taking the sign of the output signal 514 to provide the separated two-level symbol pulse waveform.

Thus, the adaptive slicer operates by initially selecting whichever has the greater magnitude of the real and imaginary parts of the complex signal, and using this as an approximation to the correct argument or phase, which will typically be somewhere in-between the two. After a while, the rest of the circuitry will lock in to the incoming signal so that the desired phase becomes aligned with the real axis. Thus after a time the detected signal will be essentially exactly what is desired and not just an approximation to it. It should be noted that if frequency correction of the received signal (AFC) is accomplished by digital circuitry placed after the time synchronisation circuitry, then the approximate value will always be used, but adequate performance can still be achieved.

In a modification, indicated in dashed lines on FIG. 5, the magnitudes of the real and imaginary values are compared in subtractor 52 with positive or negative real and imaginary values previously stored in a set of four registers 57. The sign of each incoming sample, positive or negative, is used to select either a positive stored magnitude or a negative stored magnitude, respectively, for comparison. The registers 57 then contain values that are representative of the positive and negative peak real and imaginary values of the symbol pulse. In this case the circuit 58 detects whether the positive or negative stored value of the larger of the real and imaginary values has the greater magnitude, and controls the true/invert unit 512 accordingly. The output of circuit 58 which is applied to shifter now provides the difference between the positive and negative stored values for the larger of the real and imaginary magnitudes.

Figure 6:
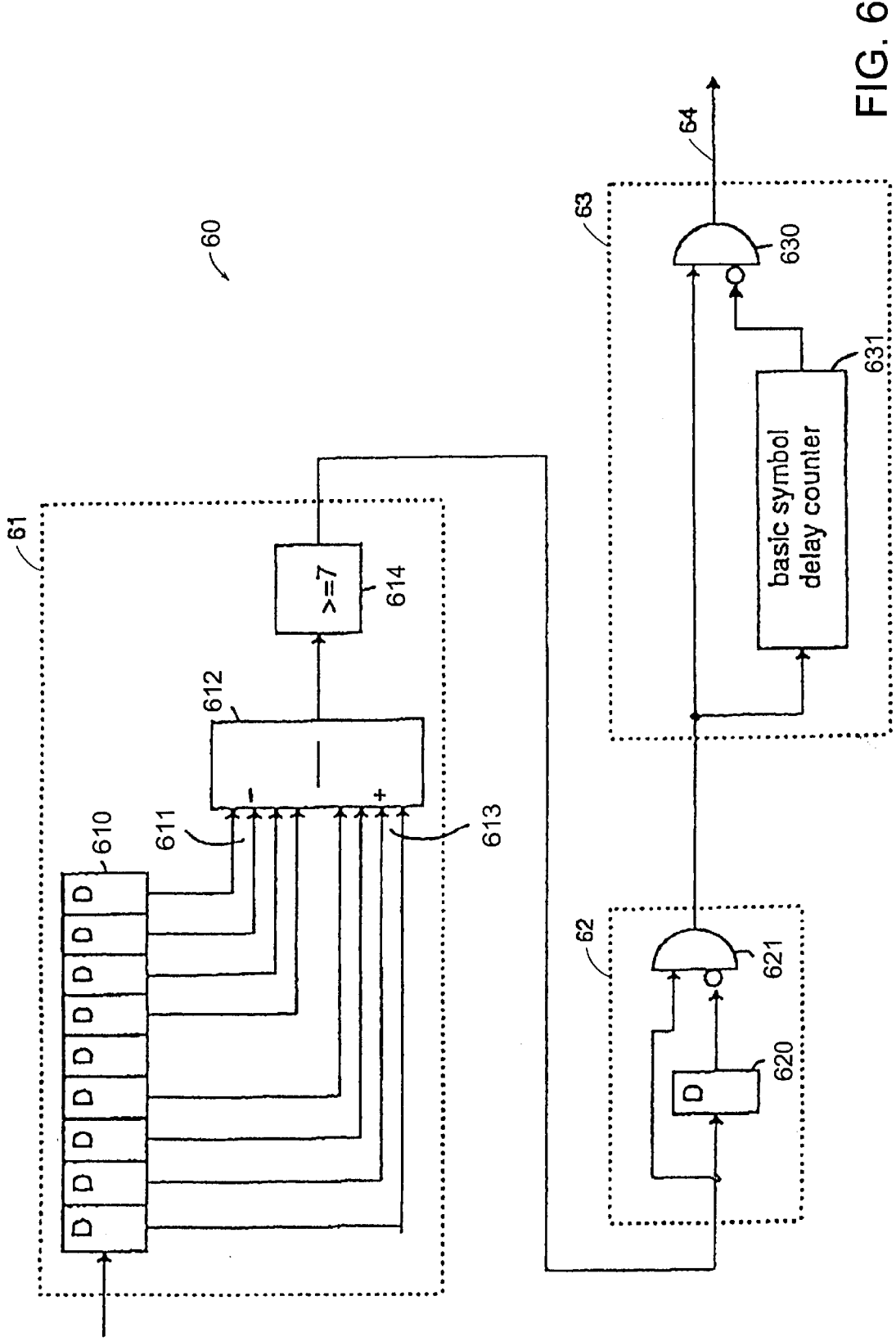
FIG. 6 is a block circuit diagram of the pulse processing circuit of the synchronization circuit in the receiver of FIG. 1.

The pulse processor 60 includes circuits to produce a single short pulse from the rising edge of the symbol pulse and is shown in FIG. 6. This is desirable to ensure that the symbol counter 70, described below, operates accurately. A majority logic gate 61 comprise a sequence of nine delays 610, the last four of which are connected to subtractive inputs 611 of a combining unit 612 and the first four of which are connected to additive inputs 613 of the combining unit 612. The output of the combining unit 612 is applied to a gate 614 which determines whether the value from the combining unit 612 is equal to or greater than the value of 7. In this way the gate 61 produces an output in the region of the rising edge of the pulse. This is converted to a single pulse by differentiator 62 which consists of a delay 620 and an AND gate 621 with one inverted input. A hold-off circuit 63 consists of an AND gate 630 with one inverted input, the inverting input of which receives the output of a basic symbol delay counter 631. After the delay counter 631 has been triggered by a pulse from the differentiator, the pulse hold-off circuit 63 prevents any further pulses from being conveyed to the output 64 until the region of the next symbol pulse has been reached.

Figure 7:
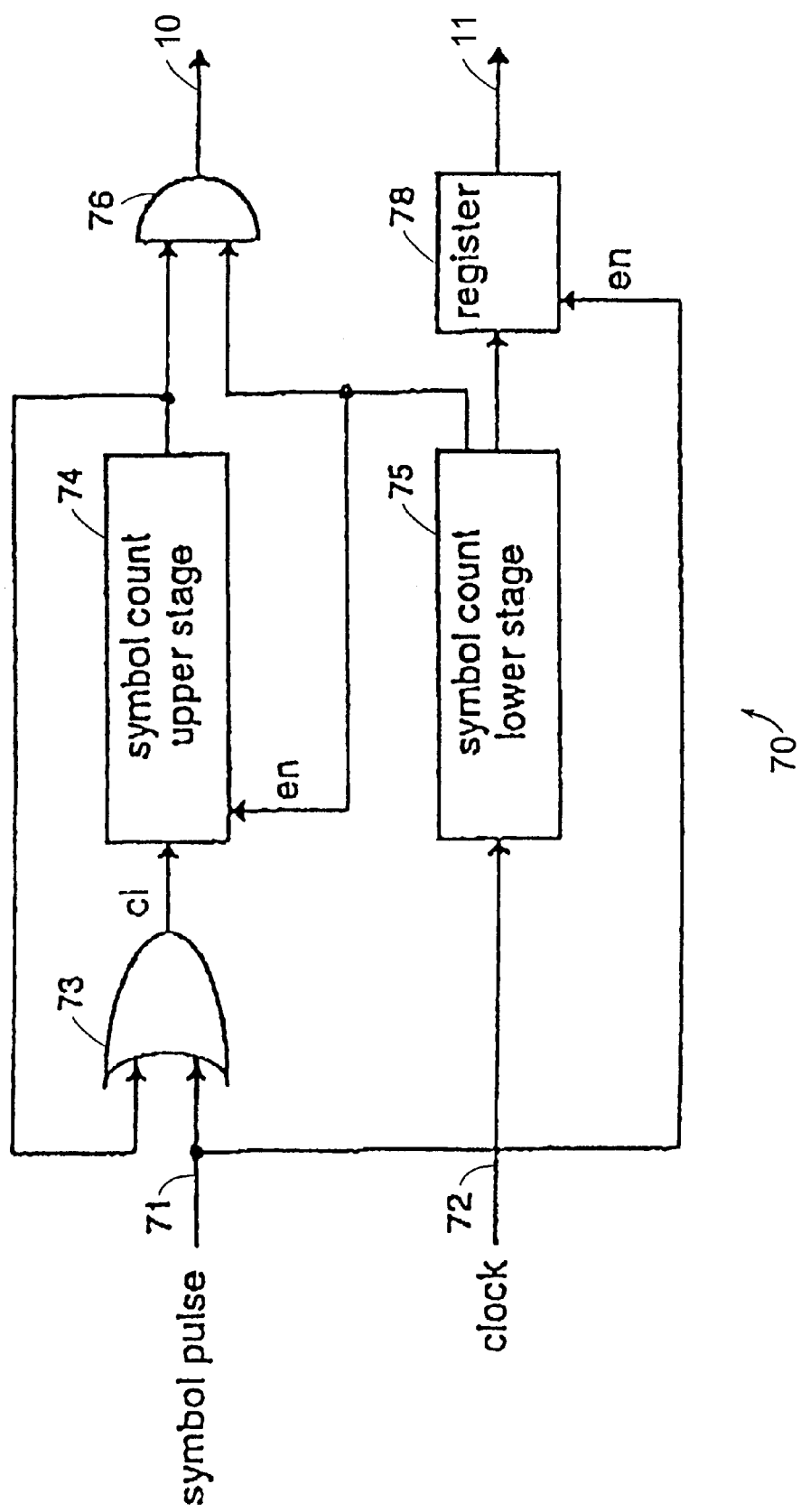
FIG. 7 is a block circuit diagram of the symbol counter of the synchronization circuit in the receiver of FIG. 1.
Figure 8:
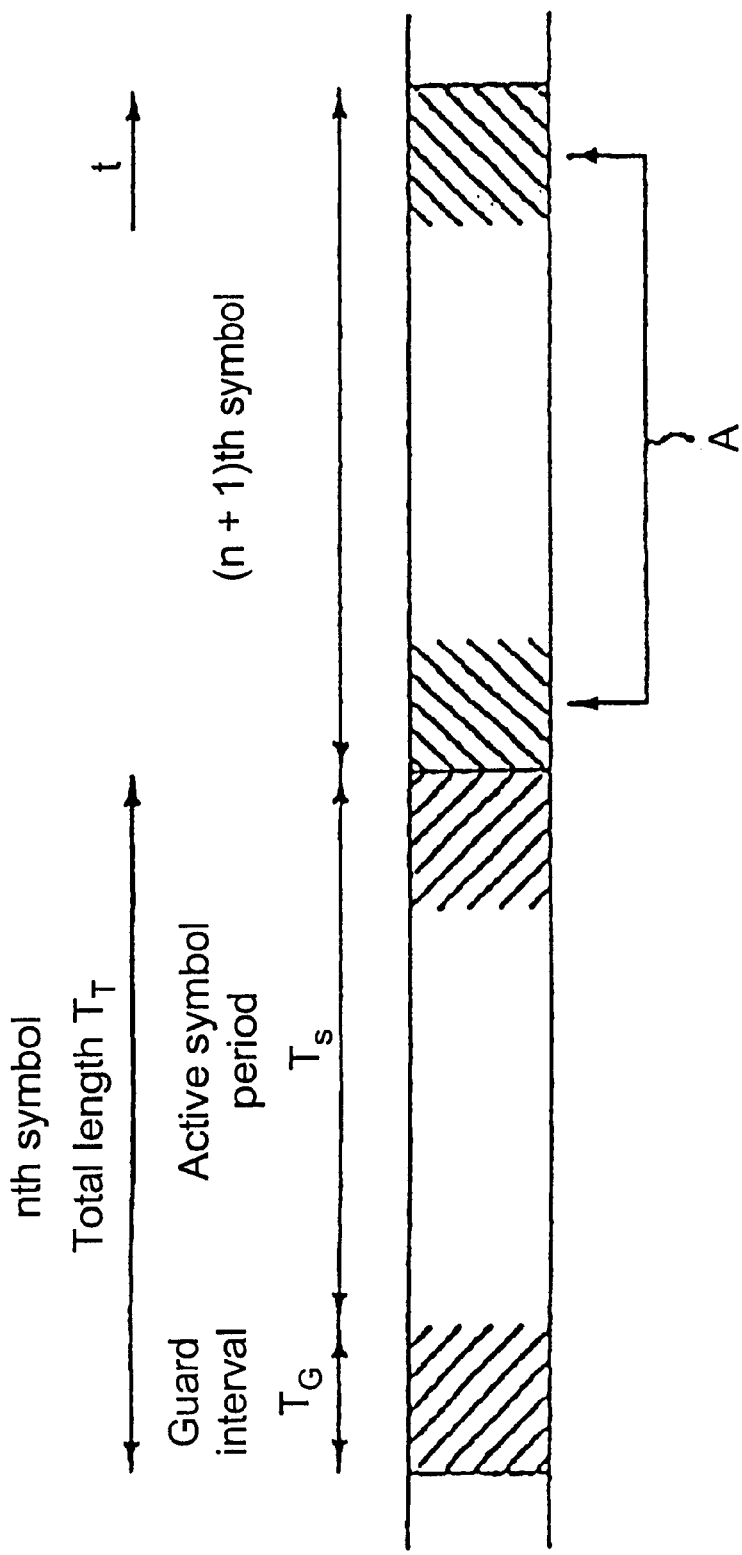
FIG. 8 (described above) is a diagram showing how each symbol comprises an active symbol and a guard interval, and illustrates the relationship between them.

Symbol pulses to start the Fourier transform are generated by the symbol counter 70, as shown in more detail in FIG. 7. The symbol counter is divided into a lower stage 75 and an upper stage 74. The symbol pulses from the pulse processor 60 received at an input 71 are applied to an OR gate 73. The output of the gate 73 is applied to the upper stage 74, the output of which is applied to an AND gate 76 which provides the output 10, and also to the other input of the gate 73. Received clock pulses from the clock oscillator 8 at an input 72 are applied to the lower stage 75, the output of which is applied to the other input to gate 76 and as an enabling input to the upper stage 74. The output of the lower stage 75 is also applied to a register 78, which receives the input symbol pulses as an enabling input. The register 78 constitutes the output 11 of the symbol counter 70 which is fed back to control the oscillator 8.

The symbol counter 70 is designed to work with OFDM signals which have different guard intervals, namely equal to $\frac{1}{32}$, $\frac{1}{16}$, $\frac{1}{8}$, or $\frac{1}{4}$ of the active symbol period. Nevertheless this is achieved with a minimum of complexity. Furthermore it does it in such a way that it is not necessary for the symbol counter to rephase itself through the total symbol period $T_T$; if this were the case it would take a very long time to pull the counter round to synchronization.

This is achieved by splitting the counter into two parts of which the lower part is common, regardless of the guard interval, and the upper part is simply variable. The counter is based on the realisation that for all the possible values of the guard interval, a highest common factor (hcf) exists for the duration, in clock pulses, of the symbol period. In the present example the actual values are:

| Guard interval | Duration of Symbol Period in Clock Pulses |
| --- | --- |
| 1/32 | 4224 |
| 1/16 | 4352 |
| 1/8 | 4606 |
| 1/4 | 5120 |

The highest common factor of the values in the right-hand column above is the value 128. This is used as the basis of the lower stage 75, which counts up to 128.

The symbol counter 70 operates in such a way that the lower stage 75 completes a whole number of count cycles in a symbol period, while the upper stage 74 advances by one each time the lower stage completes a count cycle. Thus, for the example of a system with approximately two thousand carriers and a clock frequency of 18·285714 MHz, the lower stage counts over the range 0 to 127, while the upper stage counts 0 to 32, 0 to 33, 0 to 35, or 0 to 39, depending on whether the guard interval is $\frac{1}{32}$, $\frac{1}{16}$, $\frac{1}{8}$, or $\frac{1}{4}$.

The lower stage 75 simply counts the incoming clock pulses from input 72 and is not reset. It counts modulo-128, so cycles from 0 to 127 and then returns to 0. The separated symbol pulses, from input 71, sample the lower count, storing the value in the register 78. The output signal from the register 78 is interpreted as a signal for controlling the frequency of the clock oscillator 8, through an appropriately chosen loop filter, such that a value of 0 constitutes a large negative signal and a value of 127 constitutes a large positive signal. A value of 64 gives a zero signal, so that ultimately the loop will settle with a clock frequency such that the average position of the incoming symbol pulses coincides with value 64 in the lower stage of the counter.

The lower stage 75 operates by effectively producing a ramp waveform. This waveform is identical regardless of the relative duration of the guard interval in the OFDM signal. The upper stage 74 synchronizes to the incoming symbol pulse, and this needs to be a clean and precise signal. This is why the pulse processor 60 is included.

The upper stage 74 is reset by both the incoming symbol pulses and by the upper count completing its count range. Thus the symbol counter rapidly achieves a coarse lock through the action of the symbol pulse reset, while the precise lock position is determined more gradually as a result of the action of the clock loop moving the phase of the lower count to match the incoming symbol pulses. This avoids the lockup penalties of potentially having to move the symbol counter through a whole symbol to achieve the correct phase, while maintaining regular symbol pulses to start the Fourier transform process.

The symbol period counter 70 has been described in the context of the system of FIG. 2 which takes the product XY* as described above. However, the counter 70 could be used with other arrangements in which the symbol pulses are derived in other ways.

While one example of the invention, in its various aspects, has been described, it will be appreciated that many variations may be made in the implementation of the invention. In particular, while the various aspects of the invention have been described in combination, it is possible for them to be used independently and for one or some to be employed without the other(s).

What is claimed is:

1. Apparatus for processing a signal which comprises a succession of symbol periods $T_T$ at a defined symbol frequency, each symbol period consisting of an active symbol period $T_S$ and a guard interval $T_G$, the apparatus comprising:

an input for receiving an input signal Y;

a delay coupled to the input for providing a delayed signal X from the input signal Y, the delayed signal being delayed by a time period equal to the active symbol period $T_S$;

complex product forming circuitry coupled to the input and the delay for receiving the input signal Y from the input and the delayed signal X from the delay and for forming a complex product which is one of XY* and X*Y, being the product of one of the input signal and the delayed signal, with the complex conjugate of the other of the input signal and the delayed signal and for outputting a complex product signal related to the complex product and comprising a succession of pulses having real and imaginary components, one pulse for each symbol period; and a high-pass filter coupled to the complex product forming circuitry for high-pass filtering the complex product signal to suppress frequencies below the symbol frequency.

2. Apparatus according to claim 1, further comprising clock means for generating clock signals for use in extracting the information from the input signal; and means coupled to the output of the high-pass filtering means for controlling the clock means to be in synchronism with the input signal.

3. Apparatus according to claim 1, in which the high-pass filter comprises a recursive filter.

4. Apparatus according to claim 1, in which the high-pass filter comprises low-pass filter and combining means arranged to subtract the output of the low-pass filter from the input signal.

5. Apparatus according to claim 4, in which the low-pass filtering means comprises averaging means for forming a time average of the input signal.

6. Apparatus for processing a signal which comprises a succession of symbol periods $T_T$ each consisting of an active symbol period $T_S$ and a guard interval $T_G$, the apparatus comprising:

an input for receiving an input signal Y;

a delay coupled to the input for providing a delayed signal X from the input signal Y, the delayed signal being delayed by a time period equal to the active symbol period $T_S$;

complex product forming circuitry coupled to the input and the delay for receiving the input signal Y from the input and the delayed signal X from the delay and for forming a complex product which is one of XY* and X*Y, being the product of one of the input signal and the delayed signal, with the complex conjugate of the other of the input signal and the delayed signal and for outputting a complex product signal related to the complex produce and comprising a succession of pulses having real and imaginary components, one pulse for each symbol period; and a magnitude detector coupled to the complex product forming circuitry for determining which of the real and imaginary components of the complex product signal has the larger magnitude and selecting the larger one as an output.

7. Apparatus according to claim 6, including clock means for generating clock signals for use in extracting the information from the input signal, and in which the output of the magnitude detector is applied to the clock means to control the synchronization of the clock means.

8. Apparatus according to claim 6, including Fourier transform means operating on a signal derived from the input signal, and in which the output of the magnitude detector is applied to the Fourier transform means to control the timing of the Fourier transform operation.

9. Apparatus according to claim 6, in which the magnitude detector comprises storage means and selector means arranged as part of a recursive loop, the recursive look selectively:

(a) combining in predetermined proportions a value held in the storage means of a signal derived from the complex product signal and an input value derived from the complex product signal, or (b) recirculating the value held in the storage means, in dependence upon whether the input value or the said value held in the storage means is the greater.

10. Apparatus according to claim 6, including a filter coupled between the complex product forming circuitry and the magnitude detector for high-pass filtering the complex product signal to suppress frequencies below the symbol frequency.

11. Apparatus for synchronizing with a signal which comprises a succession of symbol periods $T_T$ each consisting of an active symbol period $T_S$ and a guard interval T, the apparatus comprising:

means for forming a complex signal from the received signal;

clock means for generating clock signals for use in forming the complex signal;

means for forming symbol pulses from the input signal;

synchronization means coupled to receive the symbol pulses and the clock signals, the sychronization means including:

a first recirculating counter for counting clock signals and for providing a count representative thereof;

register means for receiving the count from the first recirculating counter and for holding the count at a time determined by the receipt of the symbol pulses, the clock means being controlled by the held count;

an OR gate having a first input coupled to receive the incoming symbol pulses and a second input, and providing an output;

a second recirculating counter coupled to receive the output of the OR gate, the second recirculating counter providing an output to the second input of the OR gate; and an AND gate coupled to receive the outputs of the first recirculating counter and the second recirculating counter to provide synchronized symbol pulses.

12. Apparatus according to claim 11, including a pulse shaping circuit between the complex signal forming means and the synchronization means.

13. Apparatus according to claim 11, including a Fourier transform circuit coupled to receive the complex signal and the synchronized symbol pulses from the synchronizing means.

14. Apparatus for processing a signal which comprises a succession of symbol periods $T_T$ at a defined symbol frequency, each symbol period consisting of an active symbol period $T_S$ and a guard interval $T_G$, the apparatus comprising:

an input for receiving an input signal Y;

a delay coupled to the input for providing a delayed signal X from the input signal Y, the delayed signal being delayed by a time period equal to the active symbol period $T_S$;

means for forming symbol pulses from the input signal;

complex product forming circuitry coupled to the input and the delay for receiving the input signal Y from the input and the delayed signal X from the delay and for forming a complex product which is one of XY* and X*Y, being the product of one of the input signal and the delayed signal with the complex conjugate of the other of the input signal and the delayed signal, and for outputting a complex product signal related to the complex product and comprising a succession of pulses having real and imaginary components, one pulse for each symbol period;

a high-pass filter coupled to the complex product forming circuitry for high-pass filtering the complex product signal to suppress frequencies substantially below the symbol frequency;

clock means for generating clock signals for use in extracting the information from the input signal;

a magnitude detector coupled to the complex product forming circuitry for determining which of the real and imaginary components of the complex product signal has the larger magnitude and selecting the larger one to control synchronization of the clock means; and synchronization means coupled to receive the symbol pulses and the clock signals, the synchronization means including:

a first recirculating counter for counting clock signals and for providing a count representative thereof;

register means for receiving the count from the first recirculating counter and for holding the count at a time determined by the receipt of the symbol pulses, the clock means being controlled by the held count;

an OR gate having a first input coupled to receive the incoming symbol pulses and a second input, and providing an output;

a second recirculating counter coupled to receive the output of the OR gate, the second recirculating counter providing an output to the second input of the OR gate; and an AND gate coupled to receive the outputs of the first recirculating counter and the second recirculating counter to provide synchronized symbol pulses.

* * * * *

UNITED STATES PATENT AND TRADEMARK OFFICE
CERTIFICATE OF CORRECTION

PATENT NO.     : 6,320,915 B1
DATED          : November 20, 2001
INVENTOR(S)    : Jonathan Highton Stott et al.

It is certified that error appears in the above-identified patent and that said Letters Patent is hereby corrected as shown below:

Title page,
Add:
-- Item [73]  Assignee: British Broadcasting Corporation, London, England
   Item [76]  Inventor: First inventor's name is Jonathan Highton Stott --

Signed and Sealed this

Seventeenth Day of September, 2002

*Attest:*

*Attesting Officer*

JAMES E. ROGAN
*Director of the United States Patent and Trademark Office*